United States Patent [19]

Kovacs

[11] 4,396,574
[45] Aug. 2, 1983

[54] BLOW MOULDING METHOD

[75] Inventor: Steve A. Kovacs, Weston, Canada

[73] Assignee: Supreme Casting & Tooling, Weston, Canada

[21] Appl. No.: 259,320

[22] Filed: Apr. 30, 1981

[51] Int. Cl.³ .............................................. B29C 17/07
[52] U.S. Cl. .................................. 264/533; 264/531; 425/525; 425/535
[58] Field of Search ....................... 264/531, 533, 523; 425/525, 535

[56] References Cited

U.S. PATENT DOCUMENTS

| | | | |
|---|---|---|---|
| 3,100,317 | 8/1963 | Perry | 264/531 |
| 3,538,543 | 11/1970 | Nataf | 425/535 |
| 3,724,987 | 4/1973 | Schiemann | 425/525 |
| 4,118,452 | 10/1978 | Myers et al. | 264/530 |

FOREIGN PATENT DOCUMENTS 22343  1/1981  European Pat. Off. ............ 264/523

Primary Examiner—Jan H. Silbaugh
Attorney, Agent, or Firm—Rogers, Bereskin & Parr

[57] ABSTRACT

The disclosure relates to a method and apparatus for blow moulding hollow plastic articles each having at an end thereof, a main opening and a secondary opening defined by an angled passageway. The method includes the step of laterally stretching a tubular parison from which the article is to be moulded so as to receive a primary mandrel for forming said opening and a secondary mandrel for forming the passageway. Air is introduced into the parison through the secondary mandrel to form the inner end portion of the passageway while the parison is expanded to conform to the shape of the mould.

5 Claims, 5 Drawing Figures

BLOW MOULDING METHOD

This invention relates generally to the art of blow moulding hollow articles of plastic material, and is concerned in particular with an improved blow moulding method and apparatus.

Blow moulding is a well-known technique used for manufacturing hollow plastic articles such as bottles. Typically, a tube or "parison" of plastic material in a hot, mouldable condition is positioned between two halves or a partible mould having a mould cavity of a shape appropriate to the required external shape of the article to be moulded. The mould halves are closed around the parison and pressurized air is introduced into the interior of the parison to cause it to expand and conform to the shape of the mould cavity. The mould cools the plastic material to its final rigid shape and the mould is then opened and the article removed. The parison is normally extruded through a die directly into position between the mould halves; in this case, the overall process is referred to as extrusion blow moulding.

Articles such as bottles having relatively wide cylindrical body portions and narrower necks can be blow moulded relatively easily. However, difficulties are often encountered in blow moulding articles having somewhat more unusual shapes. For example, it is difficult to successfully blow mould an article which has a relatively large diameter neck and a body portion of corrugated or other unusual shape; the body portion may be of bellows-like form so as to allow for longitudinal extensibility and compressibility of the article. An example of an article of this type is a protective bellows or "boot" for an automotive rack and pinion steering system. In order to successfully mould the corrugations defining the bellows-like portion of an article of this type, a relatively small diameter parison must be used. If the parison has too large a diameter, "webs" will be formed between the corrugations and the extensibility and compressibility of the bellows-like portion of the article will be lost. On the other hand, with a relatively small diameter parison it is difficult to successfully form the neck portion of the article.

The following references disclose various prior proposals for mechanically expanding part of a parison in order to facilitate moulding of articles having unusual shapes:

U.S. Pat. Nos.:
| | | | |
|---|---|---|---|
| 1,514,183 | (Steele et al) | 3,311,950 | (Strauss) |
| 2,657,431 | (Slaughter) | 3,371,376 | (Fischer) |
| 3,009,196 | (Hagen) | 3,430,290 | (Kinslow) |
| 3,080,614 | (Adams) | 3,733,384 | (Gerlovich) |
| 3,164,646 | (Fischer) | 3,911,071 | (Naumann) |
| 3,278,665 | (Harrison) | 4,032 278 | (Kuenzig) |
| 3,303,249 | (Strauss) | 4,092,392 | (Dunbeker) |
| | | 4,176,153 | (Weiler et al) |

French Patents Nos.:
| | |
|---|---|
| 1,373,990 | (Lackner) |
| 1,495,618 | (Mehnert) |
| 1,175,974 | (Ateliers et Forges de la Loire) |
| 1,415,747 | (AGK) |
| 1,441,298 | (B.A.S.F.) |

British Patent No.:
| | |
|---|---|
| 781,560 | (Glenn Proprietary) |

German Offenlegungschriften:
| | |
|---|---|
| 1,479,216 | (Fischer) |
| 1,604,632 | (Moslo) |

German Auslegeschrift:
| | |
|---|---|
| 1,178,580 | (Hagen) |

Another problem encountered in manufacturing articles such as vehicle steering boots is occasioned by the fact that the interior of the boot must be vented when the boot is to be used for a steering system which is power assisted. Such a system will normally have one boot at each side and the boot will be interconnected by a vent tube so that air displaced from one boot as it is compressed when the system is operated is displaced along the vent tube and into the other boot, which will be expanding at this time. This requires that each boot be provided with an integral port or nipple into which an end portion of the vent tube can be fitted. Typically, the nipple is required to take the form of a small tubular extension which projects outwardly from the boot adjacent its large diameter neck and which has an outer end portion closely adjacent to but spaced from the neck and extending about an axis parallel to the longitudinal axis of the boot. The passageway through the nipple must obviously communicate with the interior of the boot for venting, which means that the passageway must be angled at its inner end. In other words, the nipple has a passageway comprising an outer end portion parallel to the longitudinal axis of the bellows as a whole, and an inner end portion which is angled inwardly and which communicates with the interior of the bellows.

Manufacture of a boot having an integral nipple of this form presents significant practical difficulties. Attempts have been made to injection mould the nipples separately from the remainder of the article and then attach the nipple by heat welding. However, this requires expensive welding machinery and involves a separate manual operation. In practice, a high scrap rate was encountered in manufacturing boots by this method.

An object of the present invention is to provide an improved blow moulding method by which nipples and like formations may be integrally formed as part of such an article. In one aspect, the method and apparatus of the invention is intended to permit the blow moulding of any plastic article having a hollow body portion which defines an internal space, a main opening at an end of said portion communicating with said space and extending about a first axis, and a passageway defining a secondary opening adjacent said main opening, said passageway including an outer portion which extends about a second axis spaced from and generally parallel to said first axis, and an inner portion which is inclined inwardly towards said axis and communicates with said internal space.

One aspect of the method of the invention includes a first step of providing a partible mould comprising mould parts which can be opened and closed and which, when closed, define a mould cavity of a shape appropriate to the required external shape of the article and extending about a longitudinal axis corresponding to said first axis of the article. With the mould parts open, a tubular parison of thermoplastic material in a mouldable condition is positioned between the parts generally on said longitudinal axis. The parison includes an end portion at which the main and secondary openings of the article are to be formed and the parison has a radial dimension less than the spacing between the first and second axes of the article. A primary mandrel and a secondary mandrel are provided and are shaped to form respectively said main opening and the outer portion of the passageway in the article to be moulded. The mandrels are disposed respectively on the longitudinal axis and on a secondary axis corresponding to said second axis of the article. The secondary mandrel has an air duct which includes an air outlet disposed at an outer end of the mandrel and which is arranged so that air leaving the outlet in use will form said inner end portion of the passageway in the article. The end portion of the parison is stretched laterally to an extent sufficient to permit the mandrels to enter said end portion. The mandrels are then moved respectively along said longitudinal and secondary axes into the end portion of the parison. The mould parts are closed about the mandrels and the end of the parison opposite said one end is closed. The next step is to introduce air into the interior of the parison to cause the parison to expand and adopt the shape of the mould cavity. This step includes causing air to flow into the parison by way of the air duct in the secondary mandrel whereby the inner end portion of the passageway in the article is formed by air flowing from said air duct into the internal space of the body portion of the article. The parison is allowed to cool at least to a semi-rigid state in which it can be handled and the mould parts are opened to permit removal of the moulded article.

In order that the invention may be more clearly understood, reference will now be made to the accompanying drawings which illustrate a preferred embodiment of the invention by way of example, and in which.

Figure 1:
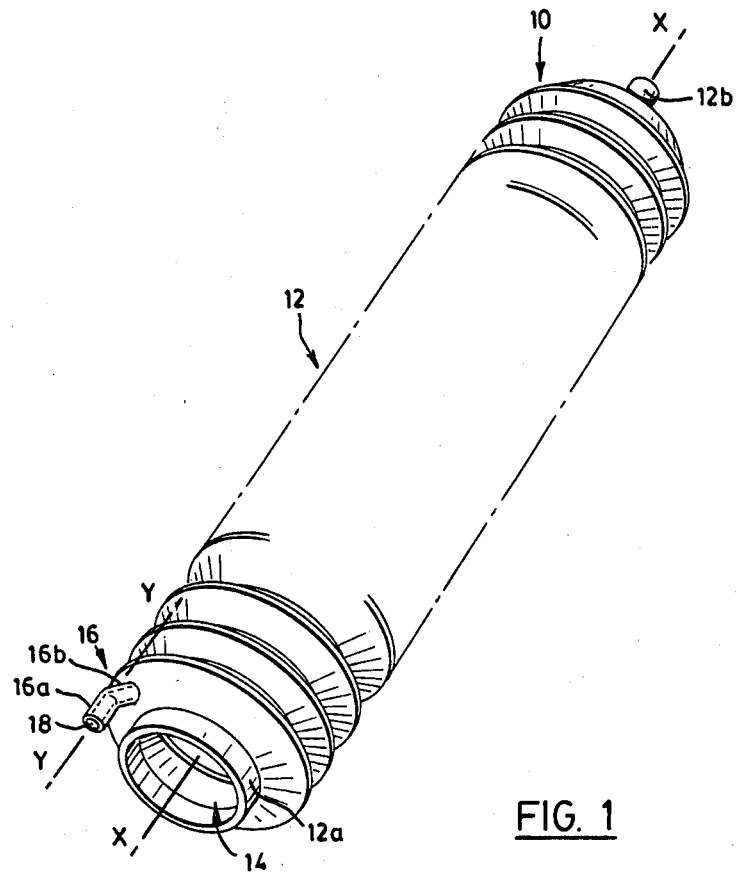
FIG. 1 is a perspective view of a "boot" for a power-assisted rack and pinion steering system, manufactured in accordance with the invention.

Reference will first be made to FIG. 1 in briefly describing a steering boot as a typical example of a plastic article which may be blow moulded in a single operation in accordance with the method and apparatus provided by the invention. The boot is generally denoted by reference numeral 10 and includes a hollow body portion 12 of corrugated or "bellows" form. The body portion has an internal space and extends about a first axis denoted "X—X". A main opening 14 is provided at one end of the body portion and extends about axis X—X in communication with the internal space of the body portion. Opening 14 is defined by a relatively wide neck 12a at the relevant end of the body portion 12. A corresponding but much smaller neck 12b is provided at the opposite end of the body portion and defines a smaller opening at other end of the boot.

Formed externally on body portion 12 is an integral nipple 16 which has an internal passageway communicating with the internal space of the body portion and defining a secondary opening 18 adjacent the main opening 14. The internal passageway of nipple 16 has an outer portion 16a which extends about a second axis Y—Y spaced from and generally parallel to the first axis X—X. The passageway also has an inner end portion 16b which is inclined inwardly towards axis X—X and which communicates with the internal space of the body portion.

As has been explained previously, there are two primary problems associated with the manufacture of boot 10 is a single blow moulding operation. Firstly, a relatively small diameter parison must be used in order to successfully mould the corrugations in the body portion of the article, but using such a parison, it is difficult to successfully form and size the relatively wide neck 12a required in this type of article. The second problem is to integrally form nipple 16 with the remainder of the article.

Figure 2:
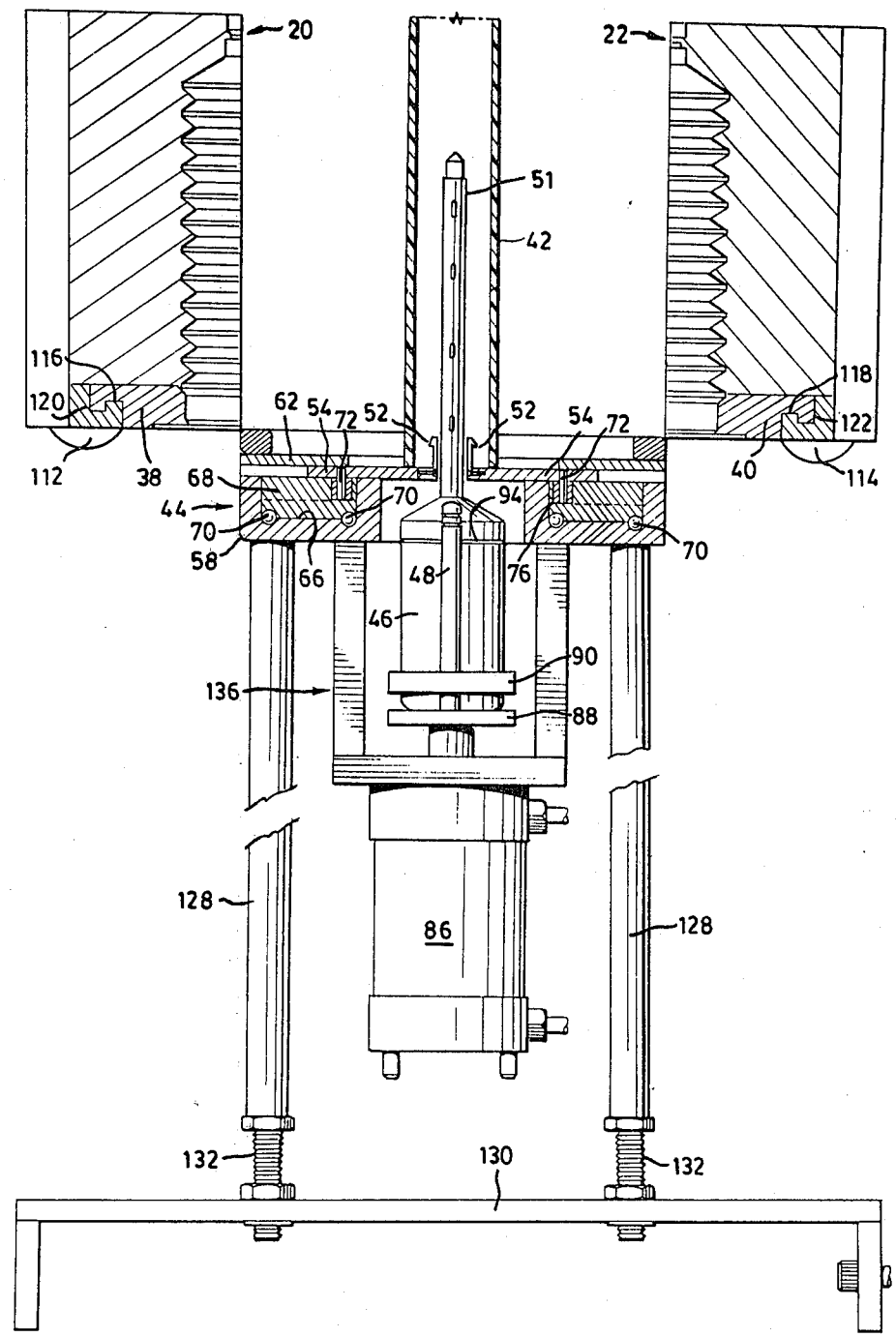
FIG. 2 is a side elevation, partly in section, of a moulding apparatus according to the invention with the mould parts shown in the open position.
Figure 3:
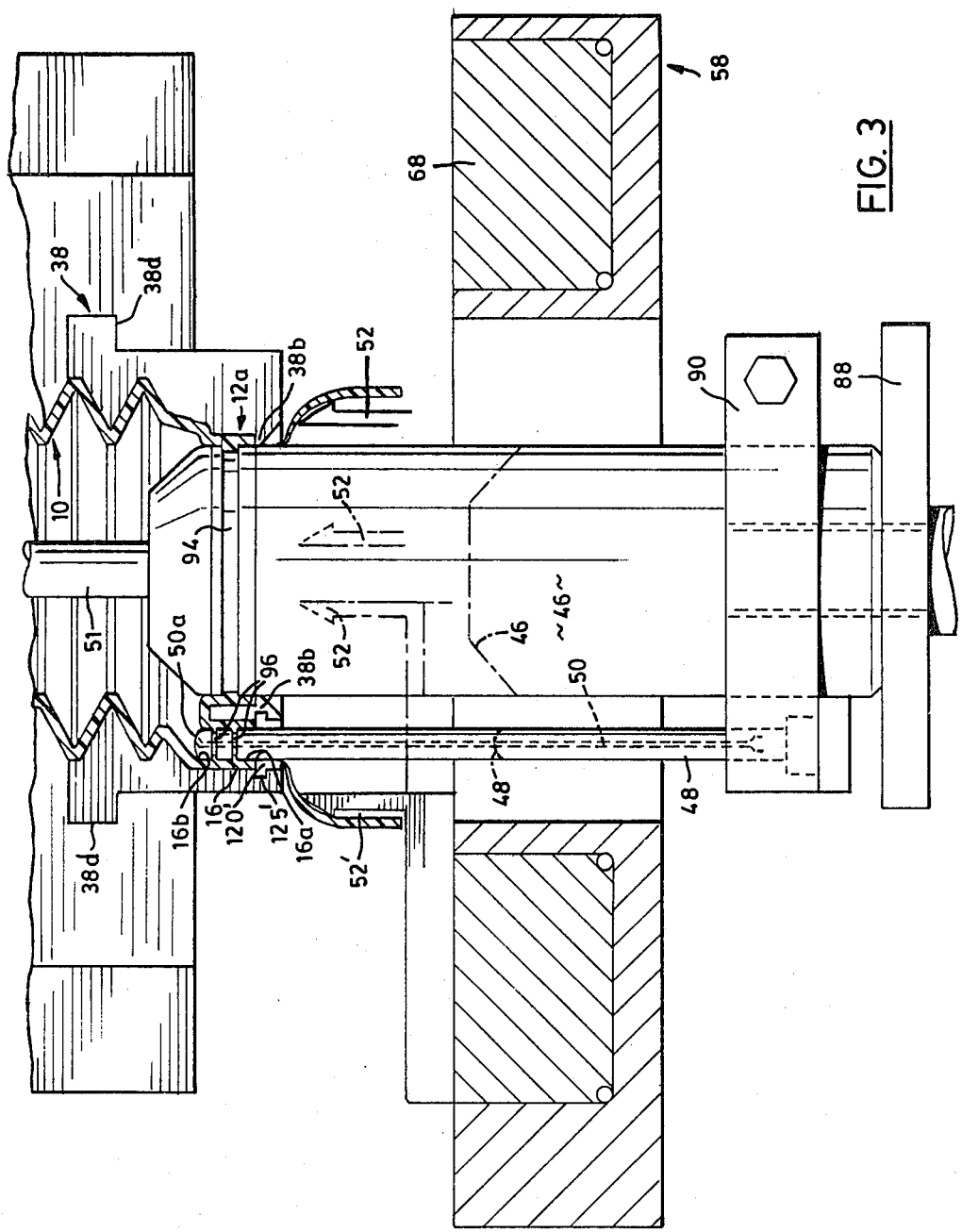
FIG. 3 is a somewhat diagrammatic partial vertical sectional view generally on line III—III of FIG. 2, the section being taken in a plane generally normal to the plane of FIG. 2.

Referring now to FIGS. 2 and 3, the blow moulding apparatus used to make boot 10 includes a partible mould comprising first and second mould parts denoted 20 and 22 respectively. In this particular embodiment, each part forms one half of the mould and the mould halves are movable between the open position in which they are shown in FIG. 2 and a closed position. For clarity of illustration, the drawings do not show supports for the mould halves or the means employed to move them between the open and closed positions. These components are entirely conventional and will be well known to persons skilled in the blow moulding art.

The mould parts are machined to define specially shaped recesses 20a and 22a respectively which cooperate when the mould is closed to define a mould cavity which extends about a longitudinal axis; this axis corresponds with the first axis X—X of the article and is therefore similarly designated. The mould cavity is of a shape appropriate to the required external shape of the article to be moulded, in this case the boot 10. Part of the article is visible in longitudinal section at 10 in FIG. 3. The mould parts also include movable mould inserts 38 and 40 which are more particularly illustrated in FIG. 5 and which will be described later in connection with that view.

Referring back to FIG. 2, the boot 10 is moulded from a tubular parison 42 of a thermoplastic material. The parison is shown in the position it occupies immediately before the mould halves 20 and 22 are closed prior to commencement of the actual blow moulding operation. At this time, the parison will be in a mouldable condition; that is, the plastic material of which the parison is made will be hot and in a form in which it can be relatively easily deformed by the application of internal air pressure. Normally, the parison will in fact be formed by a section severed transversely from a tubular extrusion fed continuously or intermittently to the moulding apparatus from an extruder as is conventional in the blow moulding art. In FIG. 1, the parison is shown supported from the extruder.

For the reasons discussed above, parison 42 is of relatively small diameter and in fact has a radial dimension less than the spacing between the axes X—X and Y—Y of the moulded article. The apparatus therefore includes a "stretcher mechanism" for mechanically engaging and expanding the lower end portion of the parison. The mechanism is generally indicated by the reference numeral 44 and will be described in detail later.

Before referring to the stretcher mechanism, however, it will be convenient to identify a mandrel assembly which appears in the center of the stretcher mechanism as seen in FIGS. 2 and 3. The mandrel assembly includes a primary mandrel 46 and a secondary mandrel 48. The secondary mandrel appears in front of the primary mandrel in FIG. 2 and the two mandrels can best been seen in FIG. 3. The main mandrel is of relatively large diameter and is designed to define the shape of and accurately size the neck 12a of the article. Mandrel 46 extends about the longitudinal axis X—X of the apparatus. Mandrel 48 is of relatively small diameter and is shaped to form the outer portion 16a of the passageway in the nipple 18 of the moulded article (see FIG. 1). Mandrel 48 has an internal air duct 50 which includes an air outlet 50a at the outer end of the mandrel arranged so that air leaving the outlet will be directed inwardly towards axis X—X and form the inner end portion 16b of the passageway in nipple 16. In other words, the air issuing from outlet 50a will blow through the plastic material which might otherwise tend to obstruct the inner end portion of the passageway so that the passageway is properly formed and will be clear internally.

Air is also introduced into the interior of the parison through a blow pin 51 which extends upwardly from the top of the main mandrel 46. Blow pin 51 is of conventional form and communicates with an air duct (not shown) in mandrel 46. The two air ducts in the respective mandrels are supplied with air from a suitable compressed air supply as is conventional in the art. Blow pin 51 is also visible in FIG. 2 and has a series of openings in its external surface through which air issues into the interior of the parison to expand the same. In that view, the mandrels 46 and 48 are shown in retracted positions such as they would occupy just after the parison 42 had been formed but before the mould parts have been closed and blowing has taken place. In FIG. 3, on the other hand, the mandrels are shown in their elevated positions as during blow moulding. The retracted positions of the upper ends of the respective mandrels are shown in ghost outline. The mechanism for moving the mandrels between their advanced and retracted positions will be described later.

Figure 4:
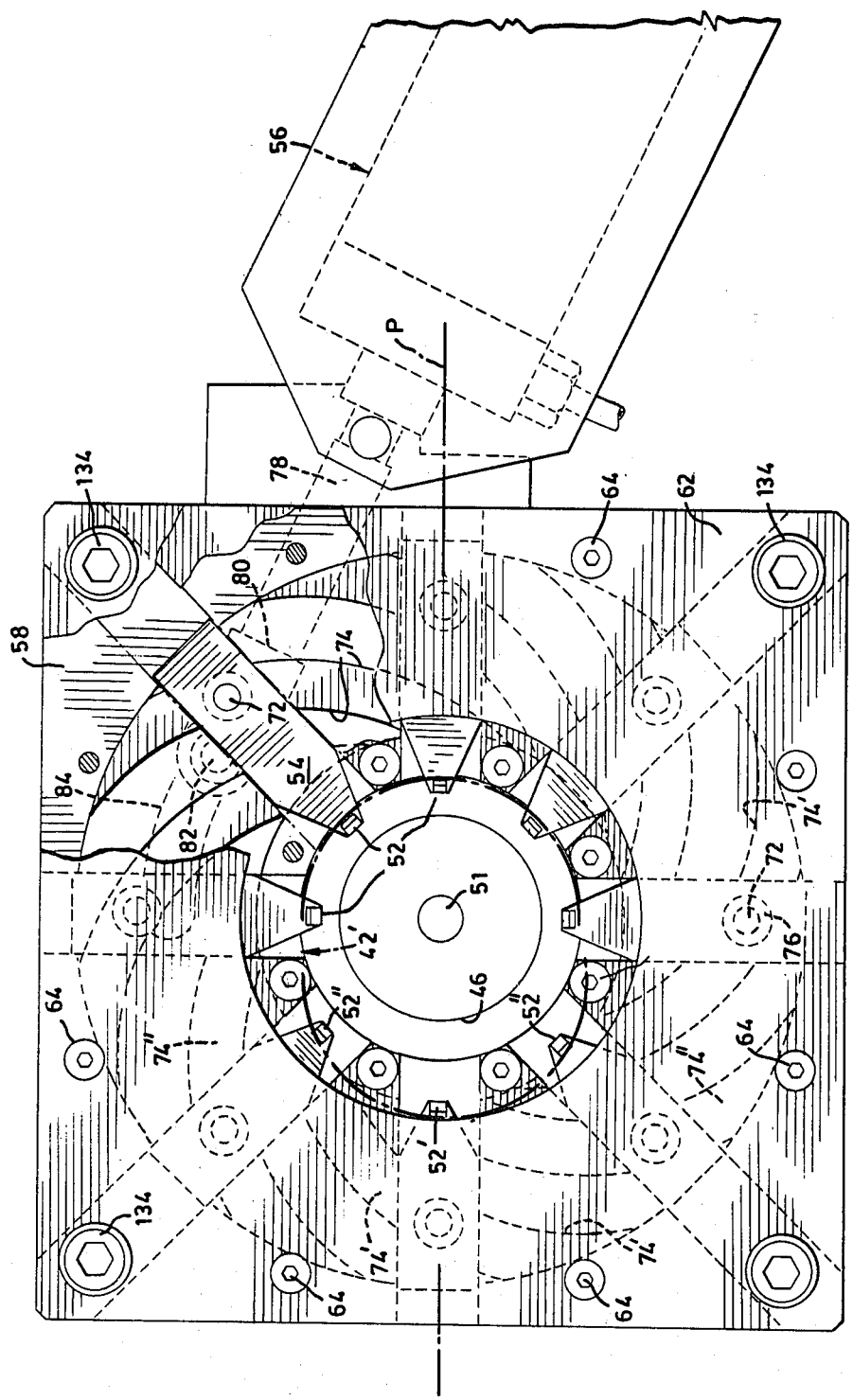
FIG. 4 is a plan view of the stretcher mechanism used for expanding the parison in accordance with the method of the invention; and, FIG. 5 is an inverted plan view with surrounding structure omitted of two mould inserts which are visible in section in FIGS. 2 and 3.

Referring particularly to FIGS. 2 and 4, stretcher mechanism 44 includes a plurality of parison engaging "fingers" arranged in an annular series around the mandrel blow pin 51 adjacent the lower end of the mould parts. Two of these fingers are visible at 52 in FIG. 2; however, by reference to FIG. 4, will be seen that eight such fingers are in fact provided and are spaced equally about the blow pin. Each finger projects upwardly from a horizontally movable slide 54 parallel to the longitudinal axis of mould cavity 24. The slides 54 are movable simultaneously to move the fingers between the normal rest positions in which two of the fingers are shown in FIG. 2, in which the fingers are all disposed closely adjacent to the blow pin 51 (and within the lower end of the parison 42) and retracted positions as shown in FIG. 4, in which the fingers have been moved outwardly to expand the lower end portion of the parison generally to the shape indicated at 42' in FIG. 4.

It will be noted that the fingers 52 move radially with respect to the mould cavity axis X—X at all times. However, the fingers 52 do not all move to the same radial extent. The primary and secondary mandrels are visible in FIG. 4 at 46 and 48 respectively and it will be noted that the finger closest to the secondary mandrel 48 (denoted 52') has moved radially further away from axis X—X and the other fingers and that the fingers on either side of finger 52' (denoted 52") has moved an intermediate distance so that the parison has been laterally stretched at the position of the secondary mandrel to an extent sufficient to permit that mandrel to enter the end portion of the parison when the mandrel is raised. This lateral stretching of the parison is not of course visible in FIG. 2 because the sectional view represented by FIG. 2 is taken in a plane normal to the plane on which the mould parts meet (denoted P in FIG. 4) and the parison is expanded symmetrically in that plane.

This differential movement between different ones of the fingers 52 is also illustrated in FIG. 3 in which finger 52' is shown in full lines in its retracted (parison expanding) position and in chain-dotted outline in its advanced position; the diametrically opposite finger 52 is similarly illustrated and it can be seen that finger will move over a much smaller radial distance than finger 52'. This differential movement is achieved by providing differently shaped cam tracks for controlling movement of the slides on which the fingers are mounted as will be described below.

Movement of the fingers between their rest positions and retracted (parison expanding) positions is controlled by a pneumatic cylinder and ram device generally denoted 56 and shown in FIG. 4 only. The slides 54 which carry the fingers 52 are mounted in respective radial grooves or slideways 60 in the underside of a cover plate 62 secured by bolts 64 to a housing 58 (see also FIG. 2). As seen in FIG. 4, the slides are substantially in their fully retracted positions.

Below the slides, housing 58 is shaped to define an annular recess 66 (FIG. 2) which receives an annular member 68 forming an actuator ring for the fingers 52. Ring 68 is mounted for free turning movement in recess 66 by way of ballbearings 70. Each of the slides 54 is fitted with a pin 72 which depends from the slide and is received in an arcuate groove 74 (FIG. 4) in the upper face of ring 68. A bearing sleeve 76 is fitted around the lower portion of each pin 72 within groove 74. Similar groove and pin arrangements are provided for each of the slides 54. The grooves 74 in effect define cam tracks and are specially shaped so that angular movement of ring 68 causes all of the slides 54 to move radially in or out depending on the direction in which the ring is turned. For example, if ring 68 is turned in the counterclockwise direction as seen in FIG. 4, the cam tracks 74 will all act on the associated bearing sleeves 76 and pins 72 to cause all slides 54 and associated fingers 52 to move inwardly towards the blow pin 58. Conversely, if the fingers 52 are in the rest (advanced) positions adjacent blow pin 51 and ring 68 is turned in the clockwise direction, the fingers will all simultaneously move outwards. The extent of this movement in either case is determined by the length of the cam tracks 74 and the angular extent through which ring 68 is turned.

The cam track for the slide associated with finger 52' is denoted 74' and is somewhat steeper (less arcuate) than the cam tracks associated with the other fingers so that finger 52' will move radially further outwards than the other fingers. Similarly, the cam tracks associated with the fingers 52" are denoted 74" and are curved slightly more than track 74' but less than the other cam tracks. This differential in curvature between the various tracks makes for corresponding differentials in the radial movement of the associated fingers.

Angular movement of the ring 68 is effected by the cylinder and ram device 56 referred to above. The ram of device 56 is indicated at 78 and has a coupling 80 at its outer end. A link pin 82 extends vertically upwardly from coupling 80 through an arcuate slot 84 in the bottom wall of housing 58 and is secured to ring 68 at its upper end. Thus, as ram 78 is extended and retracted, ring 68 will move through discreet angular amounts. The amount of this angular movement will be determined by the stroke of ram 78, which will be selected as appropriate to the required movement of the fingers 52.

In an alternative embodiment, cylinder and ram device 56 may be replaced by a hydraulic motor arranged with its drive shaft vertical and fitted at its upper end with a spur gear which meshes with a corresponding ring gear fitted to the underside of ring 68 so that the ring can be turned by operating the motor. Obviously, the motor would have to be suitably geared and would be reversible.

FIG. 2 illustrates how the slides 54 which support the fingers 52 also serve to define the position of the parison 52 prior to commencement of the blow moulding operation. Thus, the parison should be disposed so that a lower end portion thereof extends beyond the lower ends of the mould parts 20 and 22. In the described illustrated embodiment, this end portion of the parison is engaged by the fingers 52 of the stretcher mechanism 44 and is expanded. However, in an alternative embodiment of the invention, the fingers could engage the parison within the range of movement of the mould parts, in which case the stretcher mechanism would be designed to be retracted downwardly when the mould parts are closed. In any event, the parison should preferably not be expanded beyond its required final size and shape since otherwise there may be a tendency for the parison to become trapped or crimped when the mould parts close.

As discussed previously, expansion and stretching of the lower end portion of the parison by the fingers 52 allows the mandrels 56 and 58 to move upwardly into the parison. This movement is effected by a pneumatic cylinder and ram device 86 (FIG. 2) which is mounted in a vertical position below the mandrel assembly and the ram of which is coupled to said assembly. Thus, the ram is fitted with a transverse plate 88 on which the main mandrel 46 is mounted. A bracket 90 is clamped around mandrel 46 at a position spaced above plate 88 and mandrel 48 is secured to this bracket by a bolt 92 which extends upwardly through a part of the bracket and which is screw-threaded into the lower end of the mandrel. Bolt 92 is formed as a coupling for the air supply to mandrel 48. Blow pin 51 extends upwardly from the top of mandrel 46 as mentioned previously and only part of the pin is visible in FIG. 3. The upper end of the blow pin (see FIG. 2) is shaped to co-operate with the mould parts and close the upper end of the parison when the mandrels are in their raised positions.

At this time, only upper end portions of the two mandrels actually enter the parison. These portions co-operate with the mould inserts 38 and 40 referred to previously and both the mandrels and the inserts are closely dimensioned so that the neck area of the moulded article and the nipple 16 are formed by compression between the inserts and the mandrels rather than by blow moulding as such. In other words, the neck area of the article is in fact compression moulded while the body portion is blown (as is the inner end portion of the passageway in nipple 16).

An annular groove 94 is provided around the upper end portion of mandrel 46 so as to form a corresponding protuberant rib inside the neck of the moulded article. Similar grooves 96 are provided around the upper end portion of mandrel 48 for forming similar ribs inside nipple 16. These ribs assist in properly securing the boot to the steering system components when the article installed. The mould inserts 38 and 40 are designed to be retractable away from the mandrels to free the neck of the moulded article and allow it to flex sufficiently to permit the mandrel to be withdrawn without damaging the moulded ribs formed by the grooves 94 and 96. The mould parts 20 and 22 are provided with respective parallel sided recesses which receive the inserts and allow them to slide towards and away from one another from their normal moulding positions to retracted positions in which pressure on the moulded article is relieved. Insert 38 is visible in FIG. 3 and it will be seen that the insert is formed with projecting flanges 38d which are received in a complementary undercut portion of the recess in mould half 20 so as to permit this sliding movement of the insert. Insert 40 is similarly supported in mould half 22. The inserts have respective inwardly projecting peripheral edges as edge 38b (FIG. 3) at their lower ends which co-operate with mandrels to cut off the surplus lower end portion of the parison when the mould halves are closed.

Movement of the two inserts between their advanced and retracted positions is effected under the control of respective pneumatic cylinder and ram devices 112 and 114 which are horizontally mounted behind the mould parts and portions of which are visible in FIG. 2. With continued reference to that view, it will be seen that the inserts 38 and 40 are shaped at their outer sides to define respective undercut slideways 116 and 118 which slidably interlock with associated actuator slides. These actuator slides are coupled to the respective cylinder and ram devices 112 and 114. The slides have not been shown in detail but, the two inserts 38 and 40 are shown in plan in FIG. 5; it is sufficient to note that the slides are generally wedge shaped and that the slideways 116 and 118 on the inserts are inclined with respect to the joint line between the two mould halves 20 and 22. Thus, longitudinal movement of the respective slides under the control of their associated cylinder and ram devices 112 and 114 will cause corresponding radial movement of the inserts 38 and 40 with respect to the mould cavity 24.

Figure 5:
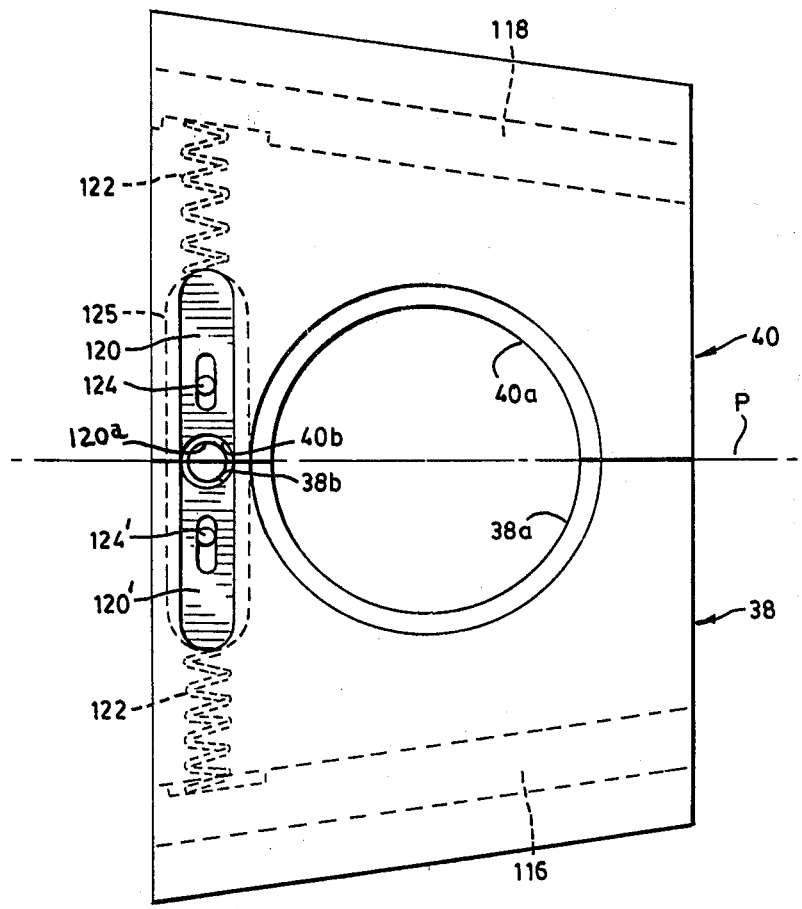

Referring now to FIG. 5, it will be seen that each of the inserts 38 and 40 has a main arcuate shaped recess for receiving the main mandrel and a smaller similarly shaped recess in which the secondary mandrel is received. The respective recesses in insert 38 are denoted 38a and 38b while the corresponding recesses in insert 40 are denoted 40a and 40b. Insert 40 is provided with a slide 120 which is biased towards recess 40b by a compression spring 122. Slide 120 has an outer edge 120a curved to engage mandrel 48 inwardly of recess 40b and is retained by a pin 124 which extends through a longitudinal slot in the slide so that, when the inserts are apart, the slide can move within the limits allowed by the slot. Slide 120 is generally T-shaped cross-section and is received in a T-shaped slideway 125, the cross-sectional shape of which can be seen in FIG. 3. A similar spring biassed slide, generally denoted 120', is provided in insert 38. The purpose of the spring-biassed slides is to apply a slight retaining force against the nipple on the moulded article as mandrel 48 is withdrawn so as to minimize the risk of distorting the nipple.

The apparatus provided by the invention is supported by four support columns, two of which are visible at 128 in FIG. 2, and which extend upwardly from a base plate 130; the columns are provided with screw adjusters 132 at their lower ends. At their upper ends, the four support columns are attached to the actuator housing 58 by four bolts 134 (FIG. 4). The device 86 for actuating the mandrel assembly is carried by brackets 136 depending from housing 58.

A typical moulding sequence will now be described primarily with reference to FIGS. 2 and 3.

With the mould halves 20 and 22 in their open positions and mandrel assembly retracted, the parison 42 is positioned over the exposed portion of the mandrel blow pin 51. Typically, the parison will be extruded into this position and supported at its upper end by the extrusion device. At this time, the cylinder and ram devices 112 and 114 associated with the mould inserts 38 and 40 will be actuated so that the inserts will be in their forward (moulding) positions and the fingers 52 will be in their normal rest positions adjacent blow pin 51. After the parison has reached the position shown in FIG. 2, the fingers 52 will be moved outwardly by actuating cylinder and ram device 56 to expand and stretch the lower end portion of the parison. Next, the mandrels 46 and 48 will move up into the position in which they are shown in FIG. 3 inside the parison. The mould halves then close onto the mandrels, trapping the parison.

Air pressure is now introduced into the parison through the mandrel blow pin 51 and through mandrel 48. This expands the parison into contact with the mould halves and causes it to conform to the shape of the mould cavity. At the same time, the inner end portion 16b of the passageway in nipple 16 is formed. The parison then cools into a relatively rigid state. Air pressure is then released and the rams of the cylinder and ram devices 112 and 114 are retracted to retract the mould inserts 38 and 40 and relieve external pressure on the neck of the moulded article.

Next, the mandrels are retracted and the mould halves open leaving the moulded article supported by the fingers 52 and slides 54. Finally, the moulded article is removed easily manually or by an air cylinder actuated "wiper" mechanism in manner known per se. The inserts 38 and 40 are then returned to their forward positions ready for the next operation.

It will of course be appreciated that the preceding description relates to a preferred embodiment of the invention only and that many modifications are possible within the broad scope of the invention. Also, it is to be noted that the method and apparatus disclosed herein may be used for moulding articles other than the article specifically referred to above. According to another aspect, the method and apparatus of the invention may be used to manufacture an article in which the secondary opening is not disposed about an axis parallel to the axis of the main opening of the article; in other words, referring to FIG. 1 of the drawings, axis Y—Y need not be parallel to axis X—X. For example, nipple 16 could extend about an axis disposed at an angle to axis X—X (e.g. a 45° angle). In that event, the secondary mandrel would have to be provided with a separate actuating device; in other words, the two mandrels could not be actuated by the same cylinder and ram device in the manner shown in the drawings. There is no limitation to articles of circular cross-section although special arrangements will obviously have to be provided for stretching the parison where the article is to be of non-circular shape.

The movable inserts 38 and 40 although desirable in the present instance, are not essential. For example, there would be no need for such inserts if the neck of the moulded article were plain.

Also, it may not be necessary to radially expand the inner end portion of the parison in all cases. Depending on the article, in some cases, it might be sufficient to merely stretch the parison to receive the secondary mandrel. The fingers around the remainder of the parison would then remain stationary and simply hold the parison in place or those fingers might even be omitted in some cases.

I claim:

1. A method of blow moulding a plastic article having a hollow body portion which defines an internal space, a main opening at an end of said portion communicating with said space and extending about a first axis, and a passageway defining a secondary opening adjacent said main opening, said passageway including an outer portion which extends about a second axis spaced from and generally parallel to said first axis, and an inner portion which is inclined inwardly towards said first axis and communicates with said internal space, the method comprising the steps of:

providing a partible mould comprising mould parts which can be opened and closed and which, when closed, define a mould cavity of a shape appropriate to the required external shape of the article and extending about a longitudinal axis corresponding to said first axis of the article;

with said mould parts open, positioning between said parts generally on said longitudinal axis, a tubular parison of a thermoplastic material in a mouldable condition, said parison including an end portion at which said main and secondary openings of the article are to be formed and having a radial dimension less than the spacing between said first and second axes of the article;

providing a primary mandrel and a secondary mandrel shaped to form respectively said main opening and the outer portion of said passageway in the article to be moulded, said mandrels being disposed respectively on said longitudinal axis and a secondary axis corresponding to said second axis of the article, and said secondary mandrel having an air duct which includes an air outlet disposed at an outer end of the mandrel and arranged so that air leaving said outlet in use will form said inner end portion of the passageway;

laterally stretching said end portion of the parison to an extent sufficient to permit said mandrels to enter said portion, by both radially expanding said end portion and laterally distorting said portion at the position of said secondary axis along which the secondary mandrel is movable;

moving said mandrels respectively along said longitudinal axis and said secondary axis into said end portion of the parison;

closing the mould parts about said mandrels and closing the end of the parison opposite said one end;

introducing air into the interior of the parison to cause the parison to expand and adopt the shape of the mould cavity, including causing air to flow into the parison by way of said air duct in the secondary mandrel, whereby said inner end portion of the passageway is formed by air flowing from said duct into the internal space in the body portion of the article;

allowing the parison to cool at least to a semi-rigid state in which it can be handled; and, opening the mould parts to permit removal of the moulded article.

2. A method as claimed in claim 1, wherein said step of laterally stretching the end portion of the parison is performed by providing a plurality of parison-engaging elements which are arranged in a generally annular configuration about said longitudinal axis of the mould cavity and which projects into said end portion of the parison generally parallel to said axis, and simultaneously moving all of said elements radially outwardly with respect to said axis along rectilinear paths which extend normal to said axis while maintaining the elements generally parallel to said axis and leaving said end of the parison unobstructed, at least one of said elements at the position of said secondary axis being moved through a radial distance greater than the remainder of said elements so as to cause said lateral distortion of the shape of the parison.

3. A method as claimed in claim 1, wherein said mould parts include respective inserts defining surface portions of said mould cavity for defining the external shape of the article in the region of said main opening and passageway, and wherein each said mandrel defines at least one external annular groove for forming an inwardly protuberant rib in the respective opening in the moulded article, and where the method comprises the further steps of:

withdrawing said mandrels from the parison after the parison has been expanded by air pressure; and, relieving the pressure between said inserts and the mandrels after the parison has been expanded but before withdrawing the mandrels, to permit the moulded article to flex and allow disengagement of the moulded ribs from said grooves in the mandrels as the mandrels are withdrawn.

4. A method as claimed in claim 3, comprising the further step of mechanically restraining the portion of the moulded article in which said passageway is formed as the secondary mandrel is withdrawn.

5. A method of blow moulding a plastic article having a hollow body portion which defines an internal space, a main opening at an end of said portion communicating with said space and extending about an axis, and a secondary opening disposed adjacent said main opening, and communicating with said internal space, the method comprising the steps of:

providing a partible mould comprising mould parts which can be opened and closed and which, when closed, define a mould cavity of a shape appropriate to the required external shape of the article and extending about a longitudinal axis corresponding to said axis of the article;

with said mould parts open, positioning between said parts generally on said longitudinal axis, a relatively narrow tubular parison of a thermoplastic material in a mouldable condition, said parison including an end portion at which said main and secondary openings of the article are to be formed;

providing a primary mandrel and a secondary mandrel shaped to form respectively said main and secondary openings, said secondary mandrel having an air duct which includes an air outlet disposed at an outer end of the mandrel;

laterally stretching said end portion of the parison to an extent sufficient to permit said mandrels to enter said portion, by both radially expanding said end portion and laterally distorting said portion at the position at which said secondary mandrel is to enter said portion;

moving said mandrels into said end portion of the parison;

closing the mould parts about said mandrels and closing the end of the parison opposite said one end;

introducing air into the interior of the parison to cause the parison to expand and adopt the shape of the mould cavity, including causing air to flow into the parison by way of said air duct in the secondary mandrel, whereby air flows from said duct into the internal space in the body portion of the article and ensures communication between said secondary opening and said internal space;

allowing the parison to cool at least to a semi-rigid state in which it can be handled; and, opening the mould parts to permit removal of the moulded article.

* * * * *